United States Patent
Ohsumi et al.

(10) Patent No.: US 10,928,629 B2
(45) Date of Patent: Feb. 23, 2021

(54) VEHICLE-MOUNTED IMAGE PROCESSING DEVICE

(71) Applicant: HITACHI AUTOMOTIVE SYSTEMS, LTD., Ibaraki (JP)

(72) Inventors: Ken Ohsumi, Hitachinaka (JP); Hidenori Shinohara, Hitachinaka (JP); Kenichi Takeuchi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/073,623

(22) PCT Filed: Jan. 25, 2017

(86) PCT No.: PCT/JP2017/002416
§ 371 (c)(1),
(2) Date: Jul. 27, 2018

(87) PCT Pub. No.: WO2017/163584
PCT Pub. Date: Sep. 28, 2017

(65) Prior Publication Data
US 2019/0033579 A1    Jan. 31, 2019

(30) Foreign Application Priority Data
Mar. 23, 2016 (JP) .............................. JP2016-057818

(51) Int. Cl.
*G02B 27/00* (2006.01)
*G03B 17/55* (2006.01)
(Continued)

(52) U.S. Cl.
CPC .......... *G02B 27/0006* (2013.01); *B60R 11/02* (2013.01); *G03B 15/00* (2013.01);
(Continued)

(58) Field of Classification Search
CPC ................... B60R 11/04; G03B 17/55; G06T 2207/30252; H04N 5/225; H04N 5/2252; H04N 5/2254
See application file for complete search history.

(56) References Cited

U.S. PATENT DOCUMENTS 8,913,178 B2 * 12/2014 Lee .................. G03B 17/55
348/373
8,941,835 B2 * 1/2015 Hirai .................. G01N 21/552
356/445

(Continued)

FOREIGN PATENT DOCUMENTS

DE        10319176 A1    11/2004
DE    102014209611 A1    11/2015
(Continued)

OTHER PUBLICATIONS

Extended European Search Report dated Nov. 4, 2019 for the European Patent Application No. 17769631.7.

(Continued)

*Primary Examiner* — Zaihan Jiang
(74) *Attorney, Agent, or Firm* — Volpe Koenig (57) ABSTRACT

The present invention attains a vehicular imaging device in which condensation on a lens can be actively removed using a simple structure. The vehicular imaging device according to the present invention is provided with: lenses; imaging elements on which images are formed by light that has passed through the lenses; a processing circuit substrate which processes the images captured by the imaging element; and a housing in which the processing circuit substrate is held. Heat dissipation structures which each dissipate heat generated by the processing circuit substrate are provided to the housing. The heat dissipation structures each have a heat dissipation surface along the direction toward the corresponding lens.

12 Claims, 7 Drawing Sheets

(51) Int. Cl.
    *H04N 5/225*      (2006.01)
    *B60R 11/02*      (2006.01)
    *G03B 15/00*      (2021.01)
    *G06T 7/593*      (2017.01)
    *H04N 13/239*     (2018.01)
    *B60R 11/04*      (2006.01)

(52) U.S. Cl.
    CPC ............ *G03B 17/55* (2013.01); *H04N 5/225* (2013.01); *H04N 5/2252* (2013.01); *H04N 5/2254* (2013.01); *B60R 11/04* (2013.01); *G06T 7/593* (2017.01); *G06T 2207/10012* (2013.01); *G06T 2207/10028* (2013.01); *G06T 2207/30252* (2013.01); *H04N 13/239* (2018.05); *H04N 2213/001* (2013.01)

(56) References Cited

U.S. PATENT DOCUMENTS

| | | | | |
|---|---|---|---|---|
| 9,215,427 | B2* | 12/2015 | Hirai | H04N 7/18 |
| 9,539,988 | B2* | 1/2017 | Hsiao | B08B 3/10 |
| 9,544,487 | B2* | 1/2017 | Bauer | H04N 5/2251 |
| 9,635,229 | B2* | 4/2017 | Wato | H04N 5/2252 |
| 9,796,359 | B2* | 10/2017 | Field | B60S 1/0848 |
| 9,854,225 | B2* | 12/2017 | Kimura | H04N 5/2252 |
| 2008/0025750 | A1* | 1/2008 | Yamazaki | G02B 26/121 |
| | | | | 399/92 |
| 2008/0156458 | A1* | 7/2008 | Li | H01L 23/4006 |
| | | | | 165/80.3 |
| 2011/0308770 | A1* | 12/2011 | Cho | F21S 45/43 |
| | | | | 165/104.11 |
| 2013/0093948 | A1* | 4/2013 | Takeshita | G03B 17/02 |
| | | | | 348/374 |
| 2014/0009619 | A1* | 1/2014 | Koppe | B60R 11/04 |
| | | | | 348/148 |
| 2014/0119169 | A1* | 5/2014 | Wakabayashi | G11B 7/0935 |
| | | | | 369/112.23 |
| 2014/0146545 | A1* | 5/2014 | Shum | F21K 9/60 |
| | | | | 362/311.02 |
| 2014/0168507 | A1* | 6/2014 | Renaud | G03B 17/55 |
| | | | | 348/373 |
| 2015/0043200 | A1* | 2/2015 | Wilson | F21S 9/043 |
| | | | | 362/145 |
| 2015/0077590 | A1* | 3/2015 | Kuriyama | H04N 5/3745 |
| | | | | 348/231.99 |
| 2015/0103552 | A1* | 4/2015 | Aiso | F21S 45/48 |
| | | | | 362/549 |
| 2015/0241018 | A1* | 8/2015 | Williams | F21S 41/19 |
| | | | | 362/516 |
| 2015/0256729 | A1* | 9/2015 | Wato | G03B 17/02 |
| | | | | 348/311 |
| 2015/0312456 | A1 | 10/2015 | Bauer et al. | |
| 2016/0006911 | A1* | 1/2016 | Kimura | H04N 5/2252 |
| | | | | 348/47 |
| 2016/0119509 | A1* | 4/2016 | Wato | H04N 5/2251 |
| | | | | 348/148 |
| 2016/0208998 | A1* | 7/2016 | Greinke | F21S 8/061 |
| 2016/0307953 | A1* | 10/2016 | Kono | H01L 27/14618 |
| 2016/0348869 | A1* | 12/2016 | Williams | F21S 41/19 |
| 2017/0051908 | A1* | 2/2017 | Hwang | F21V 29/56 |
| 2017/0070652 | A1 | 3/2017 | Muller | |
| 2017/0276595 | A1* | 9/2017 | Gorder | G01N 21/15 |
| 2017/0322232 | A1* | 11/2017 | Ueda | G01P 15/093 |
| 2018/0106680 | A1* | 4/2018 | Nakamura | G01J 5/061 |

FOREIGN PATENT DOCUMENTS

| | | |
|---|---|---|
| EP | 2 982 941 A1 | 2/2016 |
| JP | 2006-010983 A | 1/2006 |
| JP | 2014-011484 A | 1/2014 |
| JP | 2015-058928 A | 3/2015 |
| JP | 2015-187704 A | 10/2015 |
| JP | 2016-014564 A | 1/2016 |

OTHER PUBLICATIONS

International Search Report dated May 16, 2017 for the PCT International Application No. PCT/JP2017/002416.

* cited by examiner

VEHICLE-MOUNTED IMAGE PROCESSING DEVICE

TECHNICAL FIELD

The present invention relates to a vehicle-mounted image processing device including an imaging element.

BACKGROUND ART

A vehicle-mounted camera (hereinafter referred to as a stereo camera), which is a vehicle-mounted image processing device that calculates a distance to an object by triangulation using a pair of images captured by using two imaging units and recognizes the object by the calculated distance, is increasingly applied to a vehicle-mounted system that assists safe drive of a vehicle.

Particularly, in a vehicle-mounted environment, there is an application request such as detecting a preceding vehicle, a human, an obstacle, etc. and taking a safety measure in advance, and therefore, it is necessary to surely achieve distance measurement and recognition for a far-distance object.

Additionally, in a case of utilizing such a stereo image processing system in a vehicle-mounted system, miniaturization, cost reduction, and high reliability are also required.

In this system, generally mounted is an LSI dedicated to performing processing to: identify, from among pixel information included in a pair of images, a pixel position of a feature point which is common between the two images; and obtain the number of pixels in which a feature point is deviated between the pair of images (hereinafter referred to as a disparity).

Due to the above principle, it is ideal that there is no deviation other than a disparity between a pair of images, and required is a structure in which optical characteristics and signal characteristics can be adjusted with high accuracy in each imaging means and such accuracy can be maintained.

Furthermore, it is required to obtain a feature point common between a pair of images without an error in order to improve detection performance for a preceding vehicle and the like, and to meet such a requirement, luminance values in respective feature points are preferably equal between a reference camera and the other camera constituting a pair. Therefore, it is important to prevent dew condensation on lenses of both cameras.

PTL 1 is available as a related art in this technical field. This publication discloses that "a gear that transmits power is attached to one end of a shaft of a zoom motor that generates power to actuate zooming operation of a zoom capturing lens, and a fan to circulate air inside a camera is attached to the opposite side of the shaft.

With actuation of the zoom motor, an air flow caused inside the camera by the fan is guided to a rear surface of a cover glass by an air guide member.

CITATION LIST

Patent Literature

PTL 1: JP 2006-10983 A

SUMMARY OF INVENTION

Technical Problem

As described above, it is necessary to capture an image having no deviation other than a disparity between left and right cameras at the time of capturing scenery outside a vehicle interior, however; actually dew condensation may be caused on a camera lens due to a temperature difference between the inside and the outside of the vehicle interior and increase in humidity. In a case of a stereo camera, a disparity cannot be obtained and distance to an object cannot be measure not only in a case where dew condensation is caused on lenses of both cameras but also in a case where dew condensation is caused on a lens of one of the cameras. In case where no image outside a vehicle can be recognized due to dew condensation, the stereo camera prevents occurrence of erroneous operation by stopping a function thereof.

In PTL 1 described above, a fan is provided to circulate air inside a camera, but in this case, an internal structure becomes complex, and therefore, this is not preferable from the viewpoint of quality of a vehicle-mounted camera. Additionally, in a case of detecting dew condensation by providing a heating wire in the vicinity of a lens of a windshield glass, current is applied to the heating wire to dry the dew condensation on the lens. Since warm air generation by the heating wire consumes power, fuel efficiency is degraded as a vehicle.

The present invention is made in view of the above-described points, and is directed to providing a vehicular imaging device in which dew condensation on a lens can be actively removed with a simple structure.

Solution to Problem

A vehicular imaging device of the present invention to solve the above-described problems includes a lens, an imaging element on which an image is formed by light that has passed through the lens, a processing circuit substrate that processes an image captured by the imaging element, and a housing in which the circuit substrate is held. A heat dissipation structure that dissipates heat generated by the processing circuit substrate is provided to the housing, and the heat dissipation structure has a heat dissipation surface along a direction toward the lens.

Advantageous Effects of Invention

According to the present invention, dew condensation on a lens can be actively removed by utilizing heat generation by the processing circuit substrate.

Additional features related to the present invention will be apparent from the description of the present specification and the accompanying drawings. Furthermore, other problems, structures, and effects besides those described above will be apparent from description of embodiments in the following embodiment.

DESCRIPTION OF EMBODIMENTS

In the following, respective Examples will be described with reference to the drawings.

Example 1

Figure 1A:
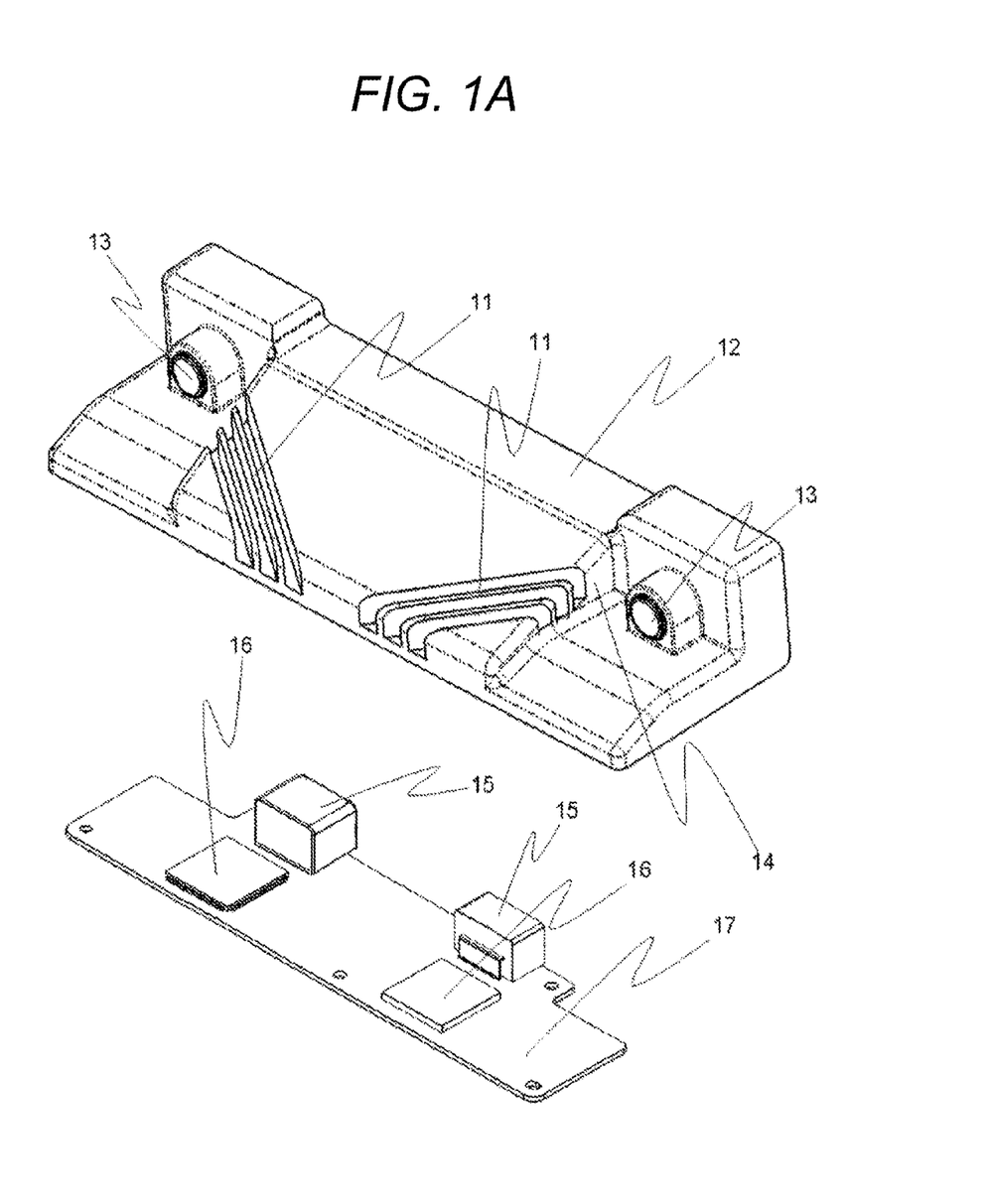
FIG. 1A is an exploded perspective view illustrating an exemplary structure of a vehicle-mounted image processing device in Example 1 according to the present invention.
Figure 1B:
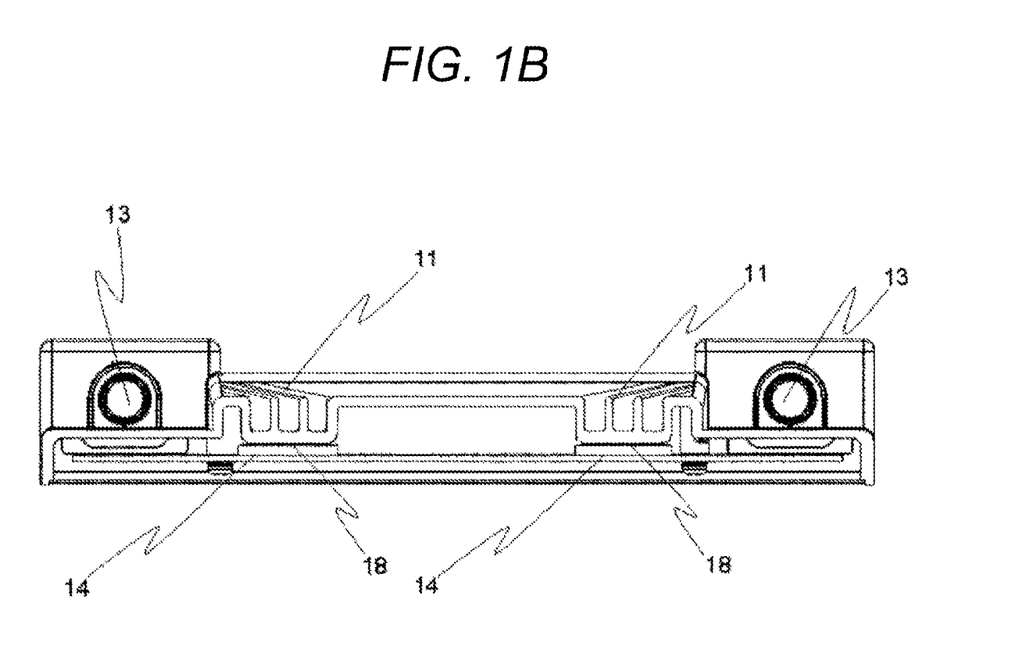
FIG. 1B is a front view of a cross-section of a stereo camera.

An embodiment of a vehicle-mounted image processing device of the present invention will be described. FIG. 1 is a diagram illustrating an exemplary heat dissipation structure of the vehicle-mounted image processing device of the present invention.

FIG. 1A is a perspective exploded view. A stereo camera, which is a vehicle-mounted image processing device, includes a pair of right and left lenses 13, an imaging element on which an image is formed by light that has passed through each of the lenses 13, a substrate (processing circuit substrate) 17 that processes an image captured by the imaging element, and a housing 12 in which the substrate 17 is held. A stereo camera has a camera unit including a lens 13 and an imaging element at one end, and also has the same camera unit at the other end. The two camera units are connected by the housing 12, and positions of the lenses are kept at a fixed baseline length. Additionally, each of both cameras has a wall 14 arranged in a manner not to bother an imaging range of the camera. Depending on a shape of a camera, the wall 14 is not constantly provided.

The housing 12 is provided with a heat dissipation structure 11 that dissipates heat generated in the substrate 17. A plurality of heat dissipation structures 11 is provided in a manner corresponding to the plurality of lenses, and in the present Example, the heat dissipation structures 11 are provided apart from each other on right and left sides corresponding to the pair of right and left lenses 13. Each heat dissipation structure 11 has a heat dissipation surface formed along a direction toward each lens 13 and is arranged in front of each lens 13. Heat dissipated from the heat dissipation surface is supplied to each lens 13, and each lens 13 is prevented from dew condensation.

Each heat dissipation structure 11 has a plurality of heat dissipation bodies, a plurality of heat dissipation protrusions, a plurality of fins, or a plurality of ribs, on which heat dissipation surfaces are arranged in a manner facing each other. The plurality of heat dissipation bodies is formed by, for example, arranging a plurality of recessed grooves in parallel on a surface of the housing 12. The plurality of heat dissipation protrusions is formed by, for example, arranging a plurality of bar protrusions in parallel on the surface of the housing 12. The plurality of fins is formed by arranging a plurality of thin plate-like protrusions in parallel on the surface of the housing 12. The plurality of ribs is formed by arranging a plurality of thick plate-like protrusions in parallel on the surface of the housing 12.

Note that the plurality of heat dissipation bodies or the like is described only to explain external shapes, and as illustrated in FIG. 1, it may be possible to adopt a solid body having no space between two heat dissipation surfaces included in one heat dissipation protrusion, or it may be also possible to adopt a hollow body having a space between the two heat dissipation surfaces included in one heat dissipation protrusion although not particularly illustrated.

Since each heat dissipation structure 11 is arranged in a manner facing a windshield glass (windshield) 23 of a vehicle, also provided is a heat dissipation air guiding structure that changes, toward a lens 13, a flow direction of air flowing from a front side to a rear side in an optical axis direction of the lens 13. The heat dissipation structure 11 has an air inflow portion that allows air inside the vehicle interior to flow in. The air inflow portion is provided at a front portion of the heat dissipation structure 11. The air having flown inside from the air inflow portion has a temperature increased by heat of an IC 16 at the time of passing through the inside of the heat dissipation structure 11, and flows toward a lens. Therefore, dew condensation on the lens can be removed more actively, and the increased temperature assists a defroster function to remove dew condensation on the windshield glass 23 in the vicinity of the lens. Therefore, an effect of removing dew condensation from the windshield glass can be obtained in a vehicle-mounted state. Each heat dissipation structure 11 is arranged diagonally below a lens 13 in a top view. Additionally, the heat dissipation structure 11 is arranged in a region from a position diagonally below a lens 13 toward the lens 13 in a top view.

Furthermore, IC for calculation (image processing element) 16 is mounted on the substrate (processing circuit substrate) 17 in order to generate an image from light received through a lens 13 by an imaging element and perform image processing. On the substrate 17, not only the IC 16 but also an interface connector 15 used to supply power to the stereo camera and output a signal from the stereo camera, and other electronic components are mounted.

The substrate 17 is fixed to the housing 12.

FIG. 1B is a front view of a cross-section of a stereo camera. A positional relation between a heat dissipation structure 11 and an IC 16 will be described.

The IC 16 for calculation is mounted on the substrate as described above, but in this case, the IC has a structure to conduct heat upward in a camera in a vehicle mounted posture. A heat dissipation structure 11 of the housing 12 is formed at a position corresponding to an IC 16 of the substrate 17. The IC 16 generates a large heat generation amount inside the substrate 17, and the heat can be effectively dissipated from the heat dissipation structure 11 of the housing 12 by conducting the heat to the housing 12. Heat of the IC 16 is conducted to the housing 12 via a heat dissipation conductive material 18. The heat dissipation conductive material 18 is, for example, a sheet-like or paste-like material.

Figure 2:
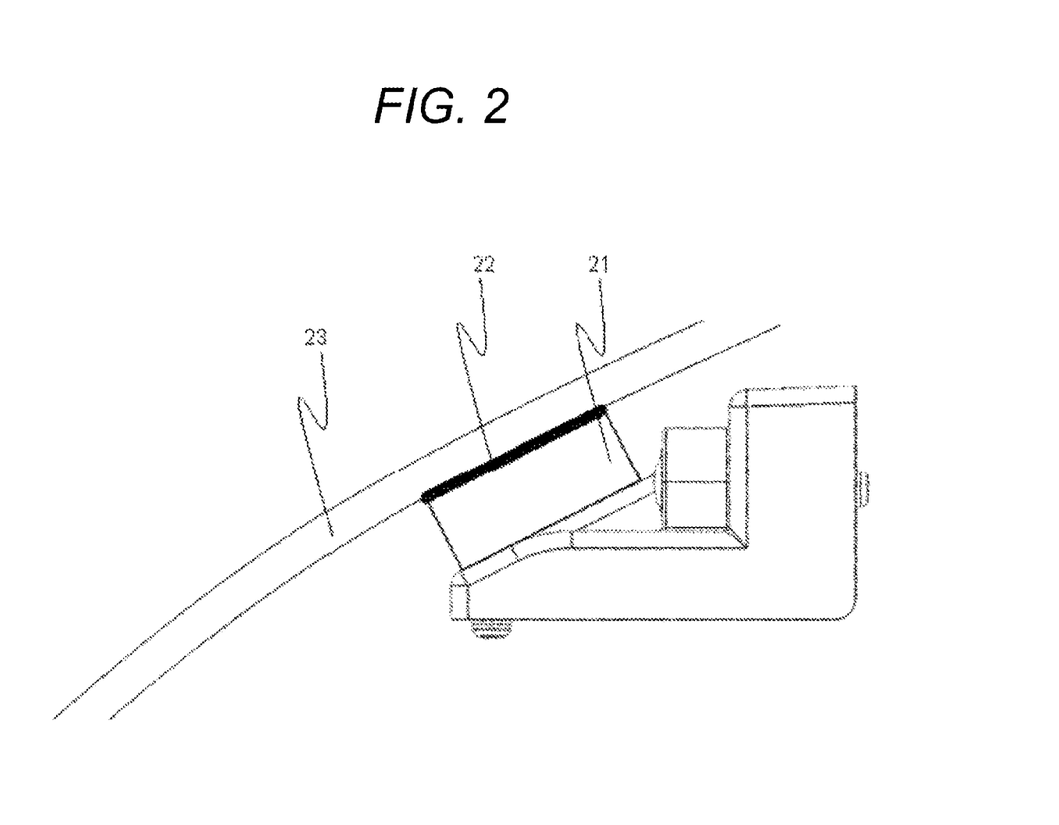
FIG. 2 is a view illustrating exemplary installation of the vehicle-mounted image processing device in Example 1 according to the present invention.

Next, attachment of a stereo camera to a vehicle will be described with reference to FIG. 2. FIG. 2 illustrates an example of fixing the stereo camera to the windshield glass 23.

The stereo camera is fixed to a camera holding member 21. Since an angle of the windshield glass 23 is different depending on a vehicle type, the angle is adjusted by the camera holding member 21 such that the stereo camera is set at a desired installation angle. To adjust the angle, it may be possible to prepare a camera holding member 21 having an angle suitable for each vehicle, or prepare a camera holding member 21 provided with an adjusting function.

The camera holding member 21 and the windshield glass are fixed to each other via a camera holding member fixing material 22 interposed therebetween. For example, an adhesive may be used as the camera holding member fixing material 22 to fix the camera holding member 21 and the windshield glass 23.

In a case where dew condensation is caused on the windshield glass 23, air is blown from a front lower side of the stereo camera by an air conditioner attached to a vehicle in FIG. 2 to remove the dew condensation.

In the vehicular imaging device of the present Example, heat dissipation structures 11 are arranged between the lenses 13 at the right and left ends. In the case of a stereo camera, a distance between one lens 13 and the other lens 13 (hereinafter referred to as a baseline length) is needed to be separated from each other in order to calculate a disparity. Furthermore, it is necessary to have the baseline length as long as possible in order to improve accuracy of a calculated disparity. Therefore, in the case of a stereo camera, an entire length of the housing 12 connecting the one lens 13 to the other lens 13 is long in a right-left direction, and a flow rate of air coming from a front lower side of each lens 13 is less than a flow rate of air coming from the front lower side and received by an entire portion of the stereo camera.

Therefore, the heat dissipation air is guided by a heat dissipation structure 11, and a flow direction of the air flowing from the front side to the rear side in the optical axis direction of a lens 13 is changed toward the lens 13. The heat dissipation structure 11 has, in front of the heat dissipation structure in the optical axis direction, an air inflow portion that allows the air blown from the front lower side of the stereo camera to flow in. The plurality of heat dissipation bodies and the like constituting the heat dissipation structures 11 are formed in a manner shifted from a center portion of the housing 12 toward the left and right lenses 13 as positions thereof approach to the rear side of the housing 12 from the front side.

Therefore, a direction of air flowing between the one lens 13 and the other one lens 13, which dominates the flow rate of the air coming from the front lower side and received by the entire stereo camera, can be changed in a direction flowing toward each of the lenses 13, and a temperature of the air flowing toward the lenses 13 can be increased. With this structure, dew condensation on the lens 13 can be reduced. Otherwise, in the case of dew condensation, a time to remove dew condensation can be shortened. Additionally, it is also possible to assist a defroster function by an air conditioner and obtain the effect of actively removing dew condensation on the windshield glass 23 in the vicinity of a lens in a vehicle-mounted state.

In this structure, an IC 16 may be arranged in the vicinity of one of the lenses 13, and a heat dissipation structure 11 may be provided thereon, but in the case of a stereo camera, it is important that optical axis directions of the left and right cameras are aligned as described above. Therefore, considering thermal deformation of the housing 12, it is preferable that an IC 16 be arranged in the vicinity of each of the right and left lenses 13 and a plurality of heat dissipation structures 11 be provided as illustrated in FIG. 1(b).

Furthermore, it is preferable that the plurality of heat dissipation structures 11 be provided at as symmetrical positions as possible with respect to the center portion in a longitudinal direction of the stereo camera. With this structure, the right and left camera units are symmetrically deformed when the housing 12 is deformed due to temperatures from the ICs 16, and degradation of performance as the stereo camera can be suppressed.

Each heat dissipation structure 11 may have a shape that shares a wall 14 provided to prevent light from the outside of a view angle of a lens 13. The wall 14 is provided at a position avoiding a camera imaging range.

Furthermore, a heat value of an IC 16 conducted to a heat dissipation structure 11 tends to be increased. The reason is that an enormous amount of calculation is performed at a high speed in each IC 16 in order to perform image processing. Particularly, in recent years, the calculation amount is increased because of having a color imaging element and increase in the number of pixels. Additionally, it is necessary to speed up a processing speed in order to perform various kinds of image processing.

Due to such situations, a heat generation amount in each IC 16 tends to be increased, and therefore, an effect obtained in the case of providing a heat dissipation structure 11 of the present invention is also improved.

According to the above-described vehicle-mounted image processing device, a heat dissipation structure 11 that dissipates heat generated in the substrate 17 is provided in the housing 12, and the heat dissipation structure 11 has a heat dissipation surface formed along a direction toward a lens 13, and therefore, dew condensation on the lens 13 can be actively removed by utilizing the heat generated in the substrate 17.

Example 2

A structure to increase a flow rate of air to a lens 13 will be described with reference to FIGS. 3A to 3D.

Figure 3A:
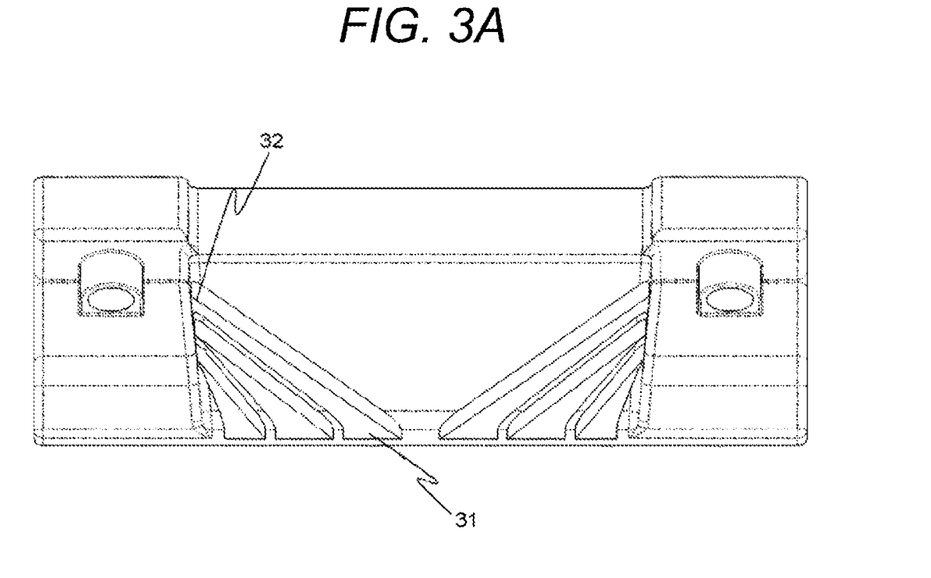
FIG. 3A is a view illustrating an exemplary structure of a heat dissipation air guiding structure in Example 2 of the present invention.

It is preferable that an air flow path inlet (air inflow portion) 31 be formed wide in order to direct, toward a lens 13, as much air as possible out of air that flows along the windshield glass 23 from a front lower side of a stereo camera.

Additionally, a plurality of heat dissipation bodies and the like constituting a heat dissipation structure 11 are arranged in a manner such that a distance between facing heat dissipation surfaces becomes gradually shorter as a position approaches closer to a lens 13, and a flow path outlet 32 is formed narrower than the flow path inlet 31. Since the flow path outlet 32 is thus formed narrower than the flow path inlet 31, the Venturi effect is obtained, and a flow speed of air coming out from the flow path outlet 32 is more accelerated than that when the air flows in. With this structure, the air is more actively sent toward a lens 13, and improves effects of dew condensation removal and dew condensation prevention.

Figure 3B:
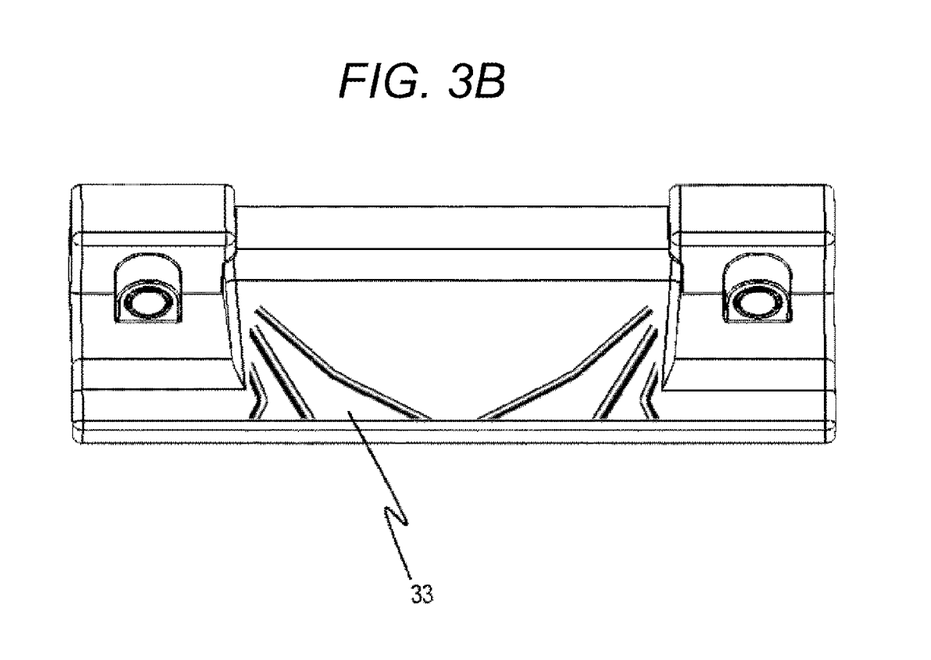
FIG. 3B is a view illustrating an exemplary structure of the heat dissipation air guiding structure in Example 2 of the present invention.

As illustrated in FIG. 3A, each of the plurality of heat dissipation bodies and the like constituting the heat dissipation structure 11 may have a shape of a linear structure extending linearly from the flow path inlet 31 toward the flow path outlet 32, or may have a shape of a nonlinear structure in which a distance between heat dissipation surfaces is gradually reduced on the way as illustrated in FIG. 3B.

Figure 3C:
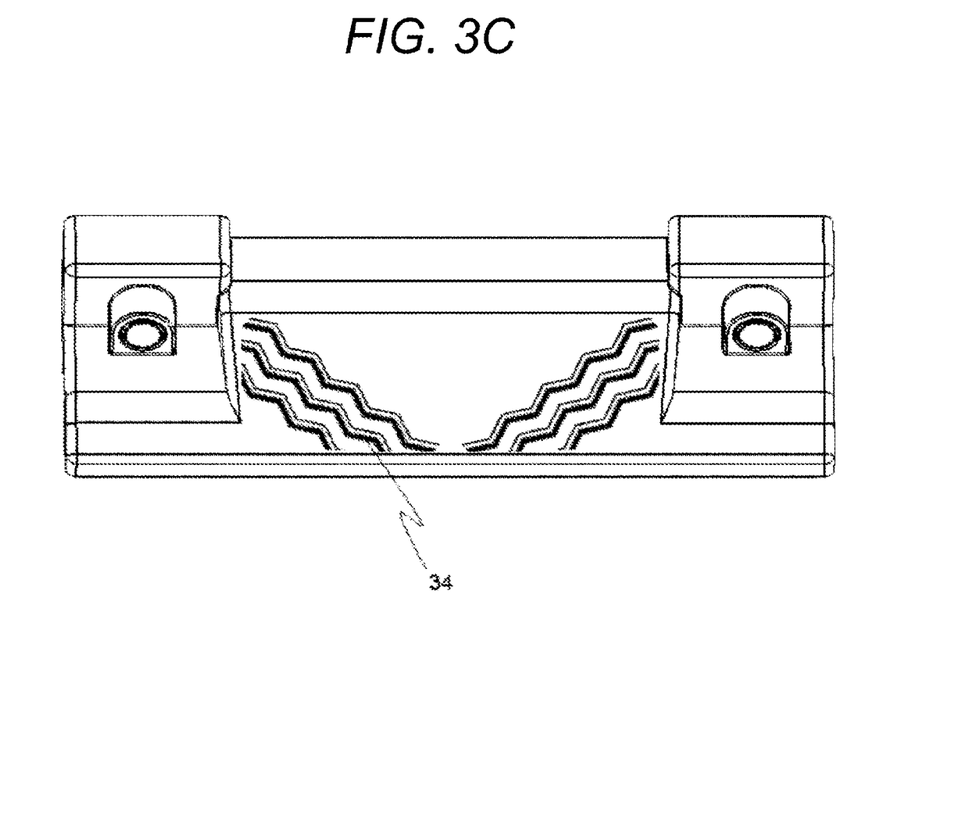
FIG. 3C is a view illustrating an exemplary structure of the heat dissipation air guiding structure in Example 2 of the present invention.

Also, as illustrated in FIG. 3C, each of the plurality of heat dissipation bodies may have a wave-like shape as a heat dissipation structure 34 in which a contact area with air is expanded. Since the contact area with the air can be increased by having the wave-like shape, a temperature of the air sent to a lens 13 can be more increased.

Figure 3D:
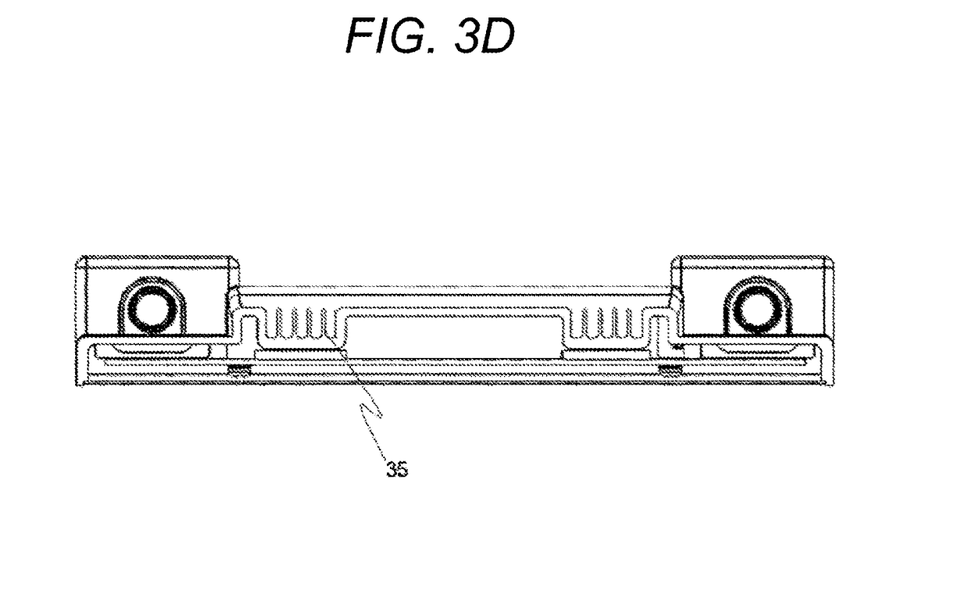
FIG. 3D is a view illustrating an exemplary structure of the heat dissipation air guiding structure in Example 2 of the present invention.

Furthermore, as illustrated in FIG. 3D, it is preferable that the plurality of heat dissipation bodies 35 and the like in the heat dissipation structure 11 be formed as thin as possible. The thinner the plurality of heat dissipation bodies 35 and the like are, the easier heat from an IC 16 is conducted inside the air, and a heat dissipation effect is enhanced. The heat dissipation structure 11 may also have a structure in which a separate member is joined to the housing 12 or may have a structure integrated with the housing 12 by performing cutting, molding, or the like. Considering productivity, it is preferable to perform molding at the same time with a mold to shape the housing 12.

Example 3

Figure 4:
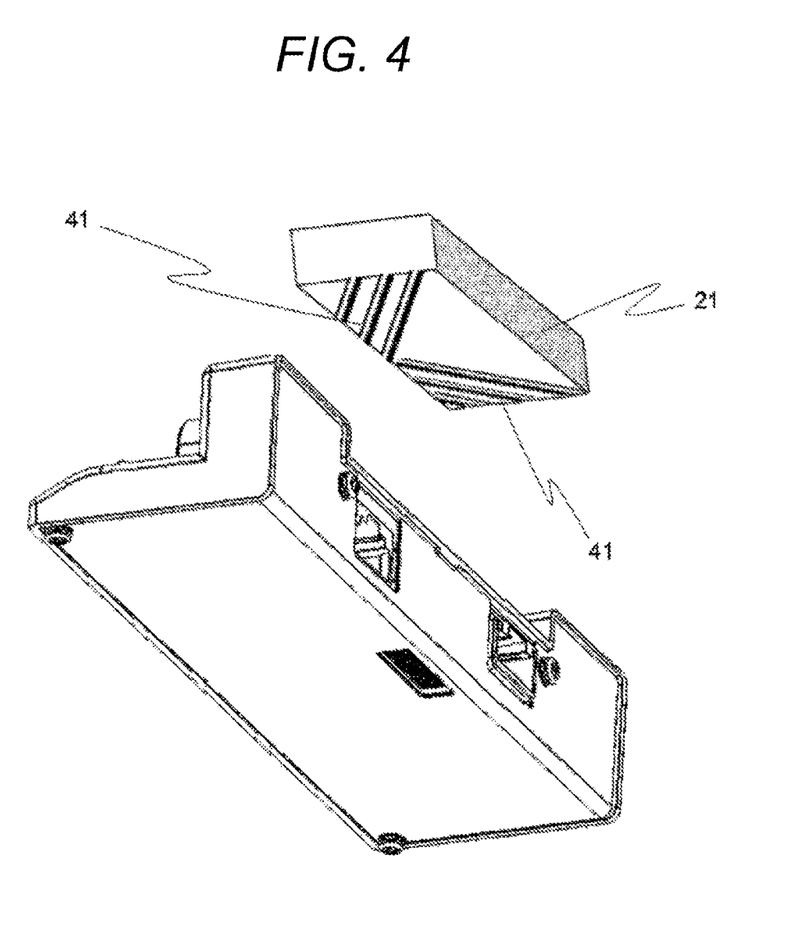
FIG. 4 is a view illustrating a vehicle-mounted image processing device in Example 3 according to the present invention.

Another exemplary installation of a heat dissipation structure 11 will be described with reference to FIG. 4.

It is more preferable that a wall that directs an air toward a lens 13 be provided in a housing 12 that contacts an IC 16 in order to utilize heat generation from an IC 16, but it may be also possible to arrange a heat dissipation structure 41 provided in the camera holding member 21 used to connect a stereo camera to the windshield glass 23. Additionally, in a case of providing, in front of a lens 13, a lens hood that blocks light from the outside of a view angle, the heat dissipation structure may be provided in this member.

Example 4

Figure 5:
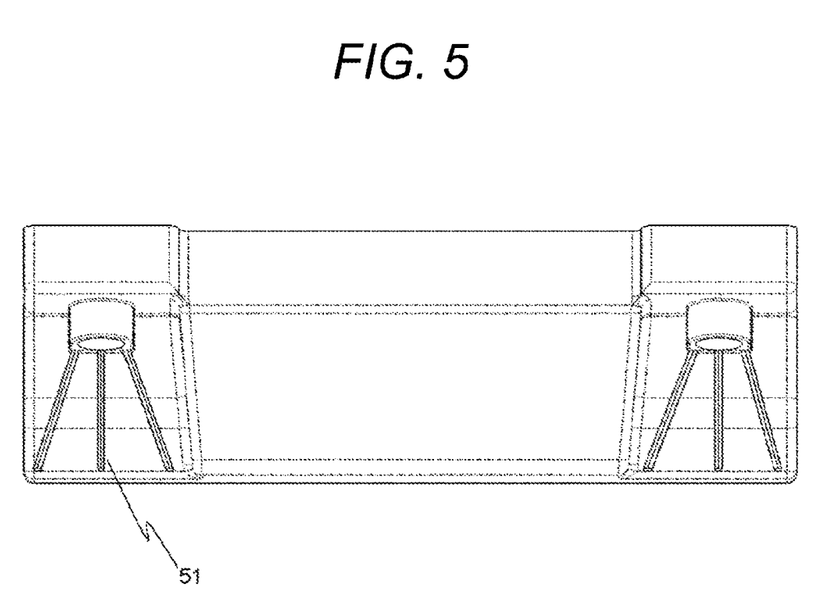
FIG. 5 is a view illustrating a vehicle-mounted image processing device in Example 4 according to the present invention.

Another exemplary structure of a heat dissipation structure will be described with reference to FIG. 5.

In the preset Example, a heat dissipation structure 51 is provided in front of a lens 13. The heat dissipation structure 51 has a plurality of bar protruding portions provided on an upper surface of the housing 12. The plurality of bar protruding portions extends in a front-rear direction of the housing 12 in front of a lens 13, and is provided in a manner such that a width in a right-left direction is gradually narrowed as positions thereof approach to the rear side. Additionally, although not specifically illustrated, an IC 16 of the substrate 17 is arranged at a position corresponding to each heat dissipation structure 51. Therefore, dew condensation on the lens 13 can be removed by utilizing heat dissipation from the IC 16 of the substrate 17, in a manner similar to above-described Examples 1 to 3. Furthermore, in a vehicle-mounted state, air blown by an air conditioner from a front lower side along the windshield glass 23 is gathered in front of a lens 13 by the plurality of bar protruding portions, and dew condensation on the windshield glass 23 in the vicinity of the lens can be removed in the vehicle-mounted state.

Note that the present invention is not limited to the above-described Examples and may include various modified examples. For example, the above Examples are described in detail for easy understanding of the present invention and the present invention is not necessarily limited to those having all of the above-described components.

Additionally, some components in one Example can be replaced with components of another Example, and also a component of another Example can also be added to components of one Example. Furthermore, addition, deletion, and substitution of another component can be made to some of the components in the respective Examples. Additionally, it is described above that the present invention is to a stereo camera, but may also be applied to a monocular image processing camera formed of one camera unit.

While the embodiment of the present invention is described above in detail, the present invention is not limited to the above-described embodiment, and various kinds of design change may be made in a range without departing from the spirit of the present invention recited in the claims. For example, the above-described embodiment is described in detail for easy understanding of the present invention and the present invention is not necessarily limited to those having all of the above-described components. Additionally, some components of one embodiment can be replaced with components of another embodiment, and also a component of another embodiment can also be added to components of one embodiment. Furthermore, addition, deletion, and substitution of another component can be made to some of the components in each embodiment.

REFERENCE SIGNS LIST 11 heat dissipation structure
12 housing
13 lens
14 wall to avoid camera imaging range
15 interface connector
16 IC
17 substrate
18 heat dissipation conductive material
21 camera holding member
22 camera holding member fixing material
23 windshield glass
31 flow path inlet
32 flow path outlet
34 heat dissipation structure with expanded contact area with air
35 thinned heat dissipation body
41 heat dissipation structure provided in camera holding member

The invention claimed is:

1. A vehicular imaging device comprising a lens, an imaging element on which an image is formed by light that has passed through the lens, a processing circuit substrate that processes an image captured by the imaging element, and a housing in which the processing circuit substrate is held, wherein
  a heat dissipation structure that dissipates heat generated by the processing circuit substrate is provided to the housing,
  the heat dissipation structure has a heat dissipation surface oriented along an axis between an image processing element and the lens to change a flow direction of air towards a face of the lens, and
  the heat dissipation surface has a first end which is closer to a center of the housing than a second end, and the first end being towards the image processing element and the second end being towards the lens.

2. The vehicular imaging device according to claim 1, wherein the heat dissipation structure is arranged on a light entry side the lens.

3. The vehicular imaging device according to claim 1, wherein
  the heat dissipation structure is arranged with the lens proximate to a windshield glass of a vehicle.

4. The vehicular imaging device according to claim 1, wherein the vehicular imaging device includes an air inflow portion that allows air inside a vehicle interior to flow into the vehicular imaging device.

5. The vehicular imaging device according to claim 1, wherein the heat dissipation structure is formed thermally adjacent to the image processing element.

6. The vehicular imaging device according to claim 1, wherein
the heat dissipation structure is oriented from a thermally adjacent position to one side of the image processing element to a thermally adjacent position of the lens.

7. The vehicular imaging device according to claim 1, wherein
a second lens is provided in the housing, and
a second heat dissipation structure is provided in the housing, and
the second heat dissipation structure is oriented along the axis between the image processing element and the second lens.

8. The vehicular imaging device according to claim 1, wherein
the heat dissipation structure has a plurality of heat dissipation bodies on which the heat dissipation surfaces are arranged in a substantially parallel orientation manner facing each other, and
the plurality of heat dissipation bodies is arranged such that a distance between the heat dissipation surfaces becomes shorter as the plurality of heat dissipation bodies approaches the lens.

9. The vehicular imaging device according to claim 1, wherein
the heat dissipation structure has a plurality of heat dissipation protrusions, on which the heat dissipation surfaces are arranged in a substantially parallel orientation, and
the plurality of heat dissipation protrusions are arranged such that a distance between the heat dissipation surfaces becomes shorter as the plurality of heat dissipation protrusions approaches the lens.

10. The vehicular imaging device according to claim 1, wherein
the heat dissipation structure has a plurality of heat dissipation fins, on which the heat dissipation surfaces are arranged in a substantially parallel orientation, and
the plurality of heat dissipation fins are arranged such that a distance between the heat dissipation surfaces becomes shorter as the plurality of heat dissipation fins approaches the lens.

11. The vehicular imaging device according to claim 1, wherein
the heat dissipation structure has a plurality of heat dissipation ribs, on which the heat dissipation surfaces are arranged in a substantially parallel orientation, and
the plurality of heat dissipation ribs are arranged such that a distance between the heat dissipation surfaces becomes shorter as the plurality of heat dissipation ribs approaches the lens.

12. The vehicular imaging device according to claim 1, wherein
the heat dissipation structure changes the flow direction of air to flow across the heat dissipating surface towards the face of the lens.

* * * * *